(12) United States Patent
Kehr

(10) Patent No.: US 9,488,155 B2
(45) Date of Patent: Nov. 8, 2016

(54) OCEAN CURRENT POWER GENERATING APPARATUS USING DUAL-DUCT WITH BOUNDARY LAYER CONTROL EFFECT

(71) Applicant: Young-Zehr Kehr, Keelung (TW)

(72) Inventor: Young-Zehr Kehr, Keelung (TW)

(73) Assignee: National Taiwan Ocean University, Keelung (TW)

( * ) Notice: Subject to any disclaimer, the term of this patent is extended or adjusted under 35 U.S.C. 154(b) by 0 days.

(21) Appl. No.: 14/243,899

(22) Filed: Apr. 3, 2014

(65) Prior Publication Data

US 2015/0145259 A1    May 28, 2015

(30) Foreign Application Priority Data

Nov. 22, 2013    (TW) .............................. 102142666 A

(51) Int. Cl.
| | |
|---|---|
| *F03B 13/10* | (2006.01) |
| *F03B 3/04* | (2006.01) |
| *H02K 7/18* | (2006.01) |

(52) U.S. Cl.
CPC ............... *F03B 13/10* (2013.01); *F03B 3/04* (2013.01); *H02K 7/1823* (2013.01); *Y02E 10/22* (2013.01); *Y02E 10/223* (2013.01); *Y02E 10/28* (2013.01); *Y02E 10/38* (2013.01)

(58) Field of Classification Search
CPC ....................................................... F03B 13/10
USPC .......................................................... 290/54
See application file for complete search history.

(56) References Cited

U.S. PATENT DOCUMENTS

| | | | | |
|---|---|---|---|---|
| 2,501,696 | A * | 3/1950 | Souczek ........................ | 290/43 |
| 3,986,787 | A * | 10/1976 | Mouton et al. .................. | 415/7 |
| 4,021,135 | A * | 5/1977 | Pedersen et al. ........... | 415/208.2 |
| 4,320,304 | A * | 3/1982 | Karlsson et al. ................ | 290/55 |
| 5,464,320 | A * | 11/1995 | Finney ............................. | 415/60 |
| 6,091,161 | A * | 7/2000 | Dehlsen et al. ................. | 290/43 |
| 6,382,904 | B1 * | 5/2002 | Orlov et al. .................... | 415/4.5 |
| 7,682,126 | B2 * | 3/2010 | Parker ............................ | 415/3.1 |
| 2009/0097964 | A1 | 4/2009 | Presz, Jr. et al. | |
| 2010/0289268 | A1 * | 11/2010 | Schiller .......................... | 290/54 |
| 2011/0115228 | A1 | 5/2011 | Stothers et al. | |

(Continued)

FOREIGN PATENT DOCUMENTS

| | | | |
|---|---|---|---|
| CN | 101952584 | | 1/2011 |
| FR | 56.102 | * | 6/1952 |

(Continued)

OTHER PUBLICATIONS

FR56.102 Translation.*

(Continued)

*Primary Examiner* — Joseph Waks
(74) *Attorney, Agent, or Firm* — Jianq Chyun IP Office

(57) ABSTRACT

An ocean current power generating apparatus using dual-duct with boundary layer control effect is provided. The ocean current power generating apparatus with dual-duct includes at least one power generating unit. The power generating unit includes a turbine, an inner duct and an outer duct. The turbine has a shaft box. The turbine is located inside the inner duct. An outer diameter of an inflow side of the inner duct is less than an outer diameter of an outflow side of the inner duct. The outflow side of the inner duct is located inside the outer duct. An outer diameter of an inflow side of the outer duct is less than an outer diameter of an outflow side of the outer duct.

11 Claims, 14 Drawing Sheets

(56) References Cited

U.S. PATENT DOCUMENTS

2011/0187110 A1  8/2011  Presz, Jr. et al.
2013/0287543 A1  10/2013 Dold et al.

FOREIGN PATENT DOCUMENTS

| | | |
|---|---|---|
| JP | S6329063 | 2/1988 |
| TW | 201233895 | 8/2012 |
| TW | M457071 | 7/2013 |
| WO | 2010141807 | 12/2010 |

OTHER PUBLICATIONS

"Office Action of European Counterpart Application", issued on Jul. 22, 2015, p. 1-p. 10.

"Office Action of Taiwan Counterpart Application," issued on Nov. 20, 2015, p. 1-p. 4.

* cited by examiner

OCEAN CURRENT POWER GENERATING APPARATUS USING DUAL-DUCT WITH BOUNDARY LAYER CONTROL EFFECT

CROSS-REFERENCE TO RELATED APPLICATION

This application claims the priority benefit of Taiwan application serial no. 102142666, filed on Nov. 22, 2013. The entirety of the above-mentioned patent application is hereby incorporated by reference herein and made a part of this specification.

BACKGROUND OF THE INVENTION

1. Field of the Invention

The invention relates to an ocean current power generating apparatus, and more particularly, to an ocean current power generating apparatus using dual-duct.

2. Description of Related Art

Because energies such as oil, coal and the like are nonrenewable, it is a tendency to utilize renewable natural energies for both human life and development in science and technology. Particularly, ocean current provides wide coverage in distribution and high in energy, thus the ocean current is highly valuable in energy utilization.

In a traditional ocean current power generating apparatus, a fluid passing through a turbine while flowing drives a generator to rotate for generating electricity. However, such ocean current power generating apparatus still requires sufficient flowing velocity and flowing amount in order to effectively generate electricity. Moreover, a power generation efficiency of the current power generating apparatus is proportional to an inflow velocity cubic of the turbine. In other words, when the inflow velocity of the turbine is higher, the power generation efficiency of the ocean current power generating apparatus is also enhanced. Accordingly, how to increase the inflow velocity of the turbine is a key indicator for determining efficiency of the ocean power generating apparatus.

SUMMARY OF THE INVENTION

The invention is directed to an ocean current power generating apparatus using dual-duct with boundary layer control effect which provides more preferable power generation efficiency.

An ocean current power generating apparatus using dual-duct with boundary layer control effect of the invention includes at least one power generating unit. The power generating unit includes a turbine, an inner duct and an outer duct. The turbine has a shaft box. The turbine is located inside the inner duct. The outer diameter of the inflow side of the inner duct is less than the outer diameter of the outflow side of the inner duct. The outflow side of the inner duct is located inside the outer duct. The outer diameter of the inflow side of the outer duct is less than the outer diameter of the outflow side of the outer duct.

In an embodiment of the invention, the outer duct is a hollow structure, a single-plate structure, or filled with foam material therein.

In an embodiment of the invention, the inflow side of the inner duct is located inside the outer duct.

In an embodiment of the invention, the inflow side of the inner duct is located outside the outer duct.

In an embodiment of the invention, the inflow side of the inner duct is aligned with the inflow side of the outer duct.

In an embodiment of the invention, the distance between the outflow side of the inner duct and the outer duct is less than the distance between the inflow side of the inner duct and the outer duct.

In an embodiment of the invention, the ocean current power generating apparatus using dual-duct with boundary layer control effect further includes a plurality of supporting struts. The supporting struts connect to the shaft box and the inner duct.

In an embodiment of the invention, the ocean current power generating apparatus using dual-duct with boundary layer control effect further includes a plurality of support struts connecting to the inner duct and the outer duct.

In an embodiment of the invention, the ocean current power generating apparatus using dual-duct with boundary layer control effect further includes a plurality of supporting struts. The supporting struts connect to the shaft box and the outer duct.

In an embodiment of the invention, the ocean current power generating apparatus using dual-duct with boundary layer control effect further includes a connecting part. The quantity of the at least one power generating unit is two. The connecting part is connected to the outer ducts of the power generating units.

In an embodiment of the invention, the ocean current power generating apparatus using dual-duct with boundary layer control effect further includes a platform. The platform connects to the power generating units.

In an embodiment of the invention, the platform includes a tail wing part, a lateral wing part and a center body. The back end of the center body is connected to the tail wing part, and the lateral wing part is located at the middle section of the center body and connected to the power generating units.

In an embodiment of the invention, the center body is a hollow structure, or filled with foam material therein.

In an embodiment of the invention, the turbine further includes a hub part, a plurality of blades and an outer ring. The hub part is connected to the shaft box. The blades are connected between the hub part and the outer ring.

In an embodiment of the invention, the ocean current power generating apparatus using dual-duct with boundary layer control effect further includes a coil part and a plurality of magnets. The coil part is disposed at the inner duct. The magnets are disposed at the outer ring. The outer ring is located inside the coil part and maintains a fixed gap away from the coil part.

Based on above, in the ocean current power generating apparatus using dual-duct with boundary layer control effect provided in the invention, the outer duct is disposed at periphery of the inner duct. When the ocean current power generating apparatus using dual-duct with boundary layer control effect is placed in the ocean current, existence of the outer duct makes the fluid hard to pass through the gap between the inner duct and the outer duct, such that most of the fluid are forced to be directed into the inner duct and passed through the turbine thereby increasing the inflow velocity of the turbine. As a result, the power generation efficiency of the ocean current power generating apparatus using dual-duct with boundary layer control effect can be effectively enhanced.

To make the above features and advantages of the disclosure more comprehensible, several embodiments accompanied with drawings are described in detail as follows.

DESCRIPTION OF THE EMBODIMENTS

Figure 1:
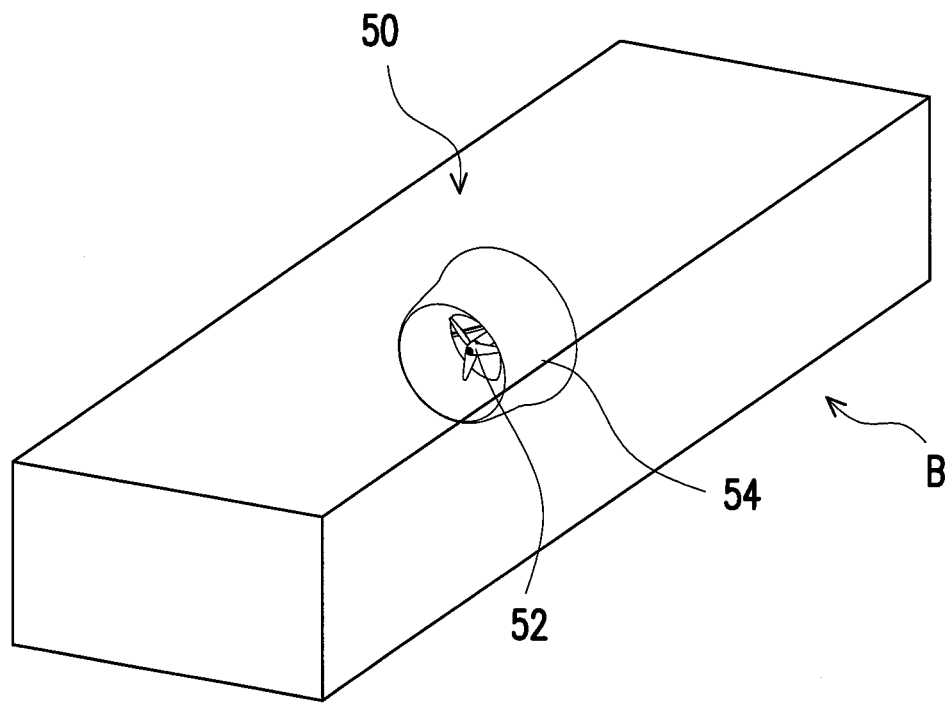
FIG. 1 is a schematic diagram of a traditional diffuser augmented turbine placed in a water tunnel test section.

A so-called diffuser augmented wind turbine (DAWT) is provided in early generation of wind power generation, which may be used to increase a power generation efficiency. The design concept of said diffuser augmented wind turbine utilized in a water tunnel test section is illustrated with reference by FIG. 1. FIG. 1 is a schematic diagram of a traditional diffuser augmented turbine placed in a water tunnel test section. Referring to FIG. 1, a diffuser augmented turbine 50 of FIG. 1 includes a turbine 52 and a duct 54. The applicant places said diffuser augmented turbine into the water tunnel test section and uses the water tunnel test section as an artificial boundary B. As compared to the diffuser augmented turbine placed in the open ocean, it is found that under the same inflow and operating conditions, a torque generated by the diffuser augmented turbine 50 placed in the water tunnel test section is far greater than that generated in the diffuser augmented turbine placed in the open ocean. Furthermore, the applicant has performed a simulated calculation for flow field as follows, so as to compare a difference between the two.

Figure 2A:
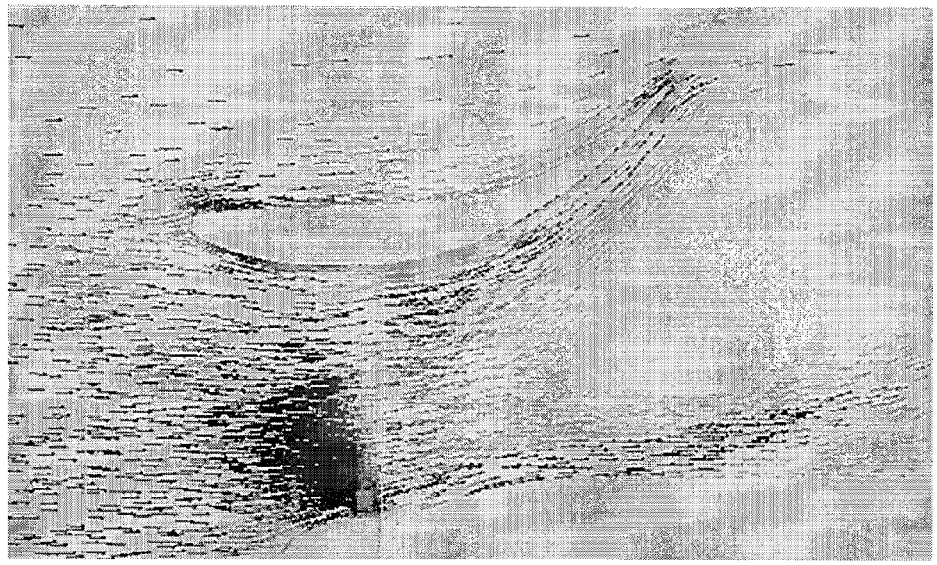
FIG. 2A is a flow field vector diagram of the diffuser augmented turbine of FIG. 1 placed in the water tunnel test section.
Figure 2B:
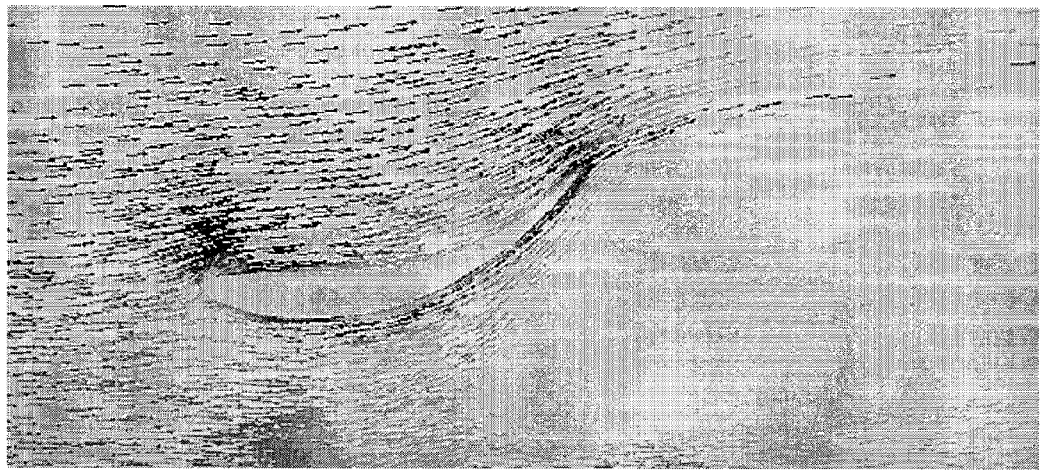
FIG. 2B is a flow field vector diagram of the diffuser augmented turbine of FIG. 1 placed in the open ocean.

FIG. 2A is a flow field vector diagram of the diffuser augmented turbine of FIG. 1 placed in the water tunnel test section. FIG. 2B is a flow field vector diagram of the diffuser augmented turbine of FIG. 1 placed in the open ocean. Referring to FIG. 2A and FIG. 2B. It should be noted that, an arrow direction in FIG. 2A and FIG. 2B indicates a direction of the flow field, whereas an arrow length indicates a magnitude of the flowing velocity. As compared to the diffuser augmented turbine placed in the open ocean, a gap between an outer diameter of the duct 54 placed in the water tunnel test section and the boundary constituted by the water tunnel test section is reduced. By comparing calculation results for the flow filed of the two, it can be found at the one with water tunnel test section as the boundary shown in FIG. 2A, because the gap between the outer diameter of the duct 54 and the boundary constituted by the water tunnel test section is reduced, a fluid cannot easily pass through, thus most of the fluid is forced to move towards inside the duct 54. Accordingly, the flowing velocity of the turbine 52 is significantly increased to enhance the torque and the power generation efficiency. The applicant proposes the following embodiments which applies aforesaid analyzed result use the diffuser augmented turbine in the open ocean (which is without the boundary) in order to enhance the torque and the power generation efficiency.

Figure 3:
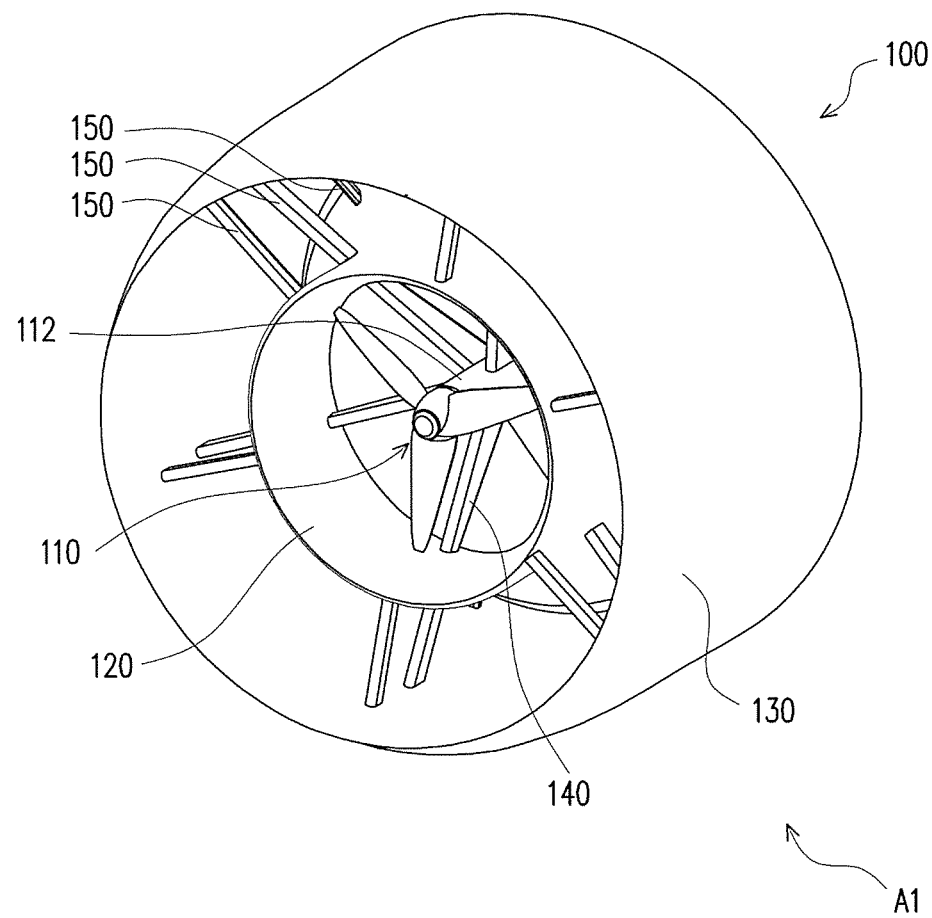
FIG. 3 is a schematic diagram of an ocean current power generating apparatus using dual-duct with boundary layer control effect according to an embodiment of the invention.

FIG. 3 is a schematic diagram of an ocean current power generating apparatus using dual-duct with boundary layer control effect according to an embodiment of the invention. Referring to FIG. 3. An ocean current power generating apparatus 100 using dual-duct with boundary layer control effect of the invention includes a power generating unit A1. The power generating unit A1 includes a turbine 110, an inner duct 120 and an outer duct 130. The turbine 110 includes a shaft box 112. The turbine 110 is located inside the inner duct 120. The inner duct 120 is located inside the outer duct 130.

Figure 4:
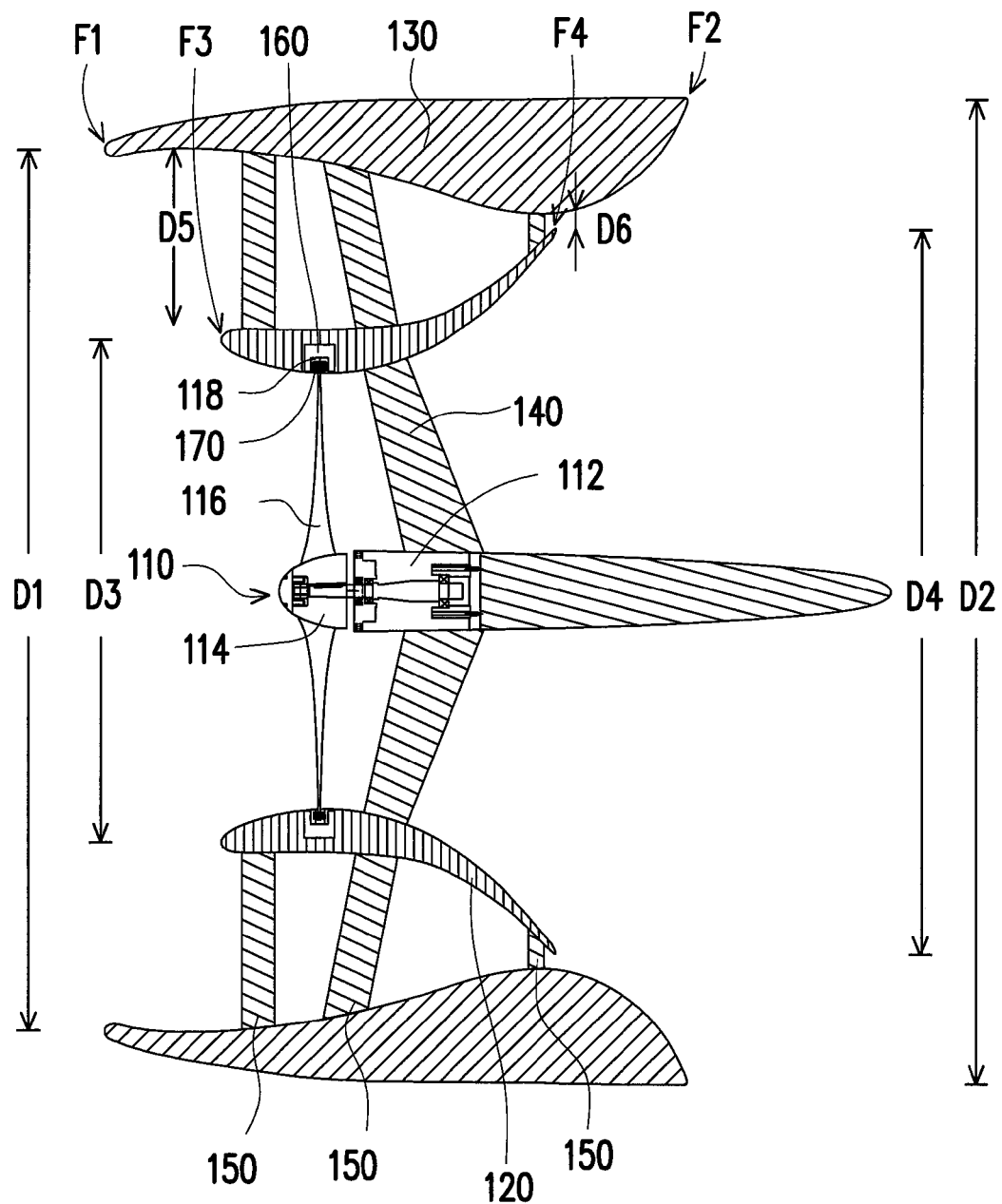
FIG. 4 is a cross-sectional diagram of the inner duct and the outer duct in FIG. 3.

FIG. 4 is a cross-sectional diagram of the inner duct and the outer duct in FIG. 3. Referring to FIG. 4. It should be noted that, when the ocean current power generating apparatus 100 using dual-duct with boundary layer control effect is placed in an ocean current, a fluid enters the outer duct 130 and the inner duct 120 from inflow sides F1 and F3, and the fluid leaves the outer duct 130 and the inner duct 120 from outflow sides F2 and F4. Accordingly, in the ocean current power generating apparatus 100 using dual-duct with boundary layer control effect of present embodiment, the fluid can only undirectionally enter the outer duct 130 and the inner duct 120 from the inflow sides F1 and F3, so as to ensures that a flowing direction of the ocean current power generating apparatus 100 using dual-duct with boundary layer control effect in the ocean current does not change freely. In the present embodiment, the outer diameter D3 of the inflow side F3 of the inner duct 120 is less than the outer diameter D4 of the outflow side F4 of the inner duct 120, and the outer diameter D1 of the inflow side F1 of the outer duct 130 is less than the outer diameter D2 of the outflow side F2 of the outer duct 130. In other words, the inner duct 120 and the outer duct 130 of the present embodiment both adopt a diffused type duct. In addition, the outflow side F4 of the inner duct 120 is located inside the outer duct 130, thus a tail part of the outer duct 130 may be connected with a diffused tail part of the inner duct 120 in terms of functionality. Accordingly, the outer duct 130 can increase the diffusion effect of the inner duct 120. In addition, a gap is existed between the inner duct 120 and the outer duct 130, in particular, the distance D6 between the outflow side F4 of the inner duct 120 and the outer duct 130 is less than the distance D5 between the inflow side F3 of the inner duct 120 and the outer duct 130. Because the distance D6 between the outflow side F4 of the inner duct 120 and the outer duct 130 is less than the distance D5 between the inflow side F3 of the inner duct 120 and the outer duct 130, the fluid is definitely accelerated while passing through the outflow side, so as to increase a kinetic energy of the boundary layer at the tail part of the inner duct 120. Accordingly, a separation caused by diffusion being overly great may be prevented from happening at the tail part of the inner duct 120, that is, the outer duct 130 may also be used for boundary layer control at the same time. It should be noted that, the outer duct and the inner duct may have different shapes and thicknesses based on requirements in practical applications.

In the ocean current power generating apparatus 100 using dual-duct with boundary layer control effect provided in the invention, the outer duct 130 is disposed at periphery of the inner duct 120. As compared to the power generating unit without the inner duct, such outer duct 130 may be used as a boundary of the inner duct 120, thus the distance between the outer diameter D4 of the tail part of the inner duct 120 and the boundary may be restricted. When the ocean current power generating apparatus 100 using dual-duct with boundary layer control effect is placed in the ocean current, existence of the outer duct 130 makes the fluid hard to pass through the gap between the inner duct 120 and the outer duct 130, such that most of the fluid are forced to be directed into the inner duct 120 and passed through the turbine 110 thereby increasing the inflow velocity of the turbine 110. As a result, the power generation efficiency of the ocean current power generating apparatus 100 using dual-duct with boundary layer control effect may be effectively enhanced.

In the present embodiment, the ocean current power generating apparatus 100 using dual-duct with boundary layer control effect further includes a coil part 160 and a plurality of magnets 170. The coil part 160 belongs to the stator, whereas the magnets 170 belong to the rotor. The coil part 160 is disposed at the inner duct 120, wherein a number of coils in the coil part 160 may be adjusted depending on actual products. The turbine 110 further includes a hub part 114, a plurality of blades 116 and an outer ring 118. The hub part 114 is connected to the shaft box 112. The blades 116 are connected between the hub part 114 and the outer ring 118, wherein an end of the blade 116 is connected to the hub part 114, and another end of the blade 116 is surrounded by the outer ring 118. The magnets 170 are disposed at the outer ring 118, and the outer ring 118 is located inside the coil part 160 and maintains a fixed gap away from the coil part 160. The ocean current power generating apparatus 100 using dual-duct with boundary layer control effect is, for example, placed in the ocean current, so that the fluid passes through the blades 116 of the turbine 110 to drive the hub part 114 of the turbine 110 to rotate with respect to a shaft in the shaft box 112, thereby converting the kinetic energy of the fluid into a mechanical energy. The rotation of the turbine 110 makes the magnets 170 on the outer ring 118 and the coil part 160 on the inner duct 120 to generate a mutual movement which cuts a magnetic field line for generating an induced current at the coil part 160, so as to convert the mechanical energy into a desired electrical energy.

More specifically, when the hub part 114 is rotated with respect to the shaft of the shaft box 112, the outer ring 118 is rotated with respect to the blades 116 and the mutual movement is provided between the magnets 170 disposed at the outer ring 118 and the coil part 160, so that the coil part 160 is induced by variation in magnetic field to generate the induced current. In addition, an intensity of the induced current is proportional to rate of variation in magnetic field of the coil parts 160. Therefore, as the hub part 114 of the turbine 110 rotates with respect to the shaft of the shaft box 112 in higher speed, a tangential velocity in rotating the magnet 170 is also increased, such that the current generated by the coil part 160 is greater. It should be noted that, positions of the magnets and the coil part are not particularly limited in the invention. In other embodiments, the kinetic energy of the fluid may still be converted into the mechanical energy by disposing the magnets and the coil part inside the shaft box 112, so that the mechanical energy may then be converted into the desired electrical energy by utilizing the electromagnetic induction principle.

In addition, the inner duct 120 of the present embodiment is illustrated as located completely inside the outer duct 130 as an example. Therein, the inflow side F3 of the inner duct 120 is located inside the outer duct 130. On the other hand, in other embodiments of the invention, the inflow side of the inner duct may also be aligned with the inflow side of the outer duct, or extruded outside the outer duct. However, the outflow side of the inner duct is still located inside the outer duct, so that the outer duct 130 can enhance the diffusion effect of the inner duct 120. As a result, the power generation efficiency of the ocean current power generating apparatus using dual-duct with boundary layer control effect may also be effectively enhanced.

In the present embodiment, the outer duct 130 is a hollow structure or filled with foam material therein, so that an overall density of the outer duct 130 is smaller than that of seawater to provide a buoyant force required by the ocean current power generating apparatus 100. For instance, the ocean current power generating apparatus 100 is fixed by utilizing ropes and anchors in the ocean to avoid drift away. Meanwhile, the ocean current power generating apparatus 100 may float in the sea through the buoyancy force provided by the outer duct 130. That is, the buoyancy force provided by the outer duct 130 to the ocean current power generating apparatus 100 is higher than a weight of the ocean current power generating apparatus 100, such that the ocean current power generating apparatus 100 is capable of floating in the sea. In view of above, other than increasing the inflow velocity of the turbine 110 to enhance the power generation efficiency of the ocean current power generating apparatus 100, the outer duct 130 of the present embodiment is also capable of providing the buoyancy force which is sufficient for floating the ocean current power generating apparatus 100 in the sea. In other practical applications (e.g., usage in shallow sea), the ocean current power generating apparatus 100 may be directly fixed on the ocean floor to avoid drift away. In addition, in case the outer duct 130 is filled with foam material or other objects therein, a capability of the outer duct 130 in resisting water pressure may also be enhanced.

Figure 5:
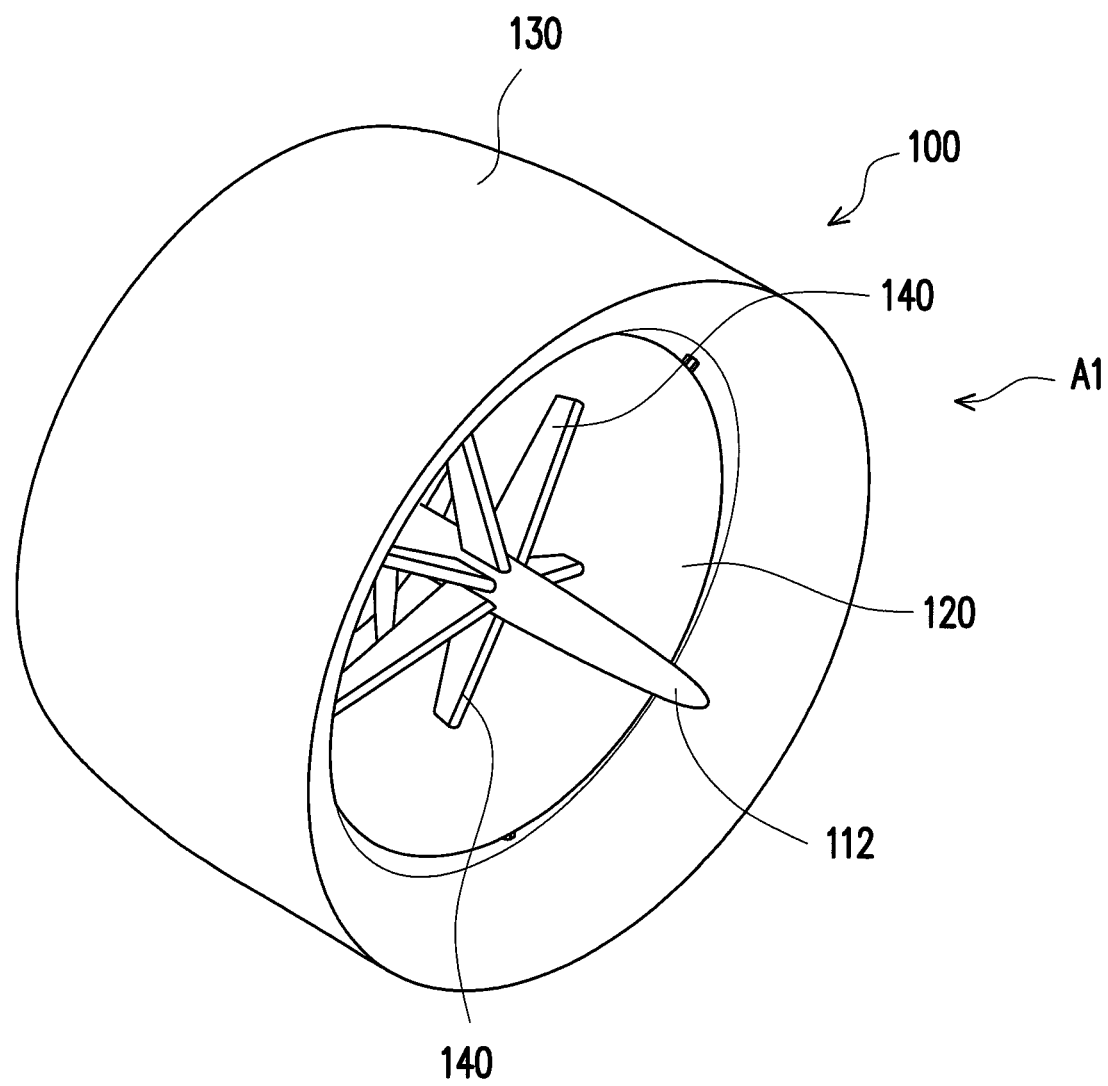
FIG. 5 is a schematic diagram of the ocean current power generating apparatus using dual-duct with boundary layer control effect of FIG. 3 from another perspective.

FIG. 5 is a schematic diagram of an ocean current power generating apparatus using dual-duct with boundary layer control effect of FIG. 3 from another perspective. Referring to FIG. 4 and FIG. 5. Fixing methods of the turbine 110, the inner duct 120 and the outer duct 130 in the ocean current power generating apparatus 100 using dual-duct with boundary layer control effect of the present embodiment are not particularly limited.

For instance, the ocean current power generating apparatus 100 of the present embodiment further includes a plurality of support struts 140 and a plurality of support struts 150. The support struts 140 connect to, for example, the shaft box 112 and the inner duct 120, so as to fix a relative position of the shaft box 112 with respect to the inner duct 120. The support struts 150 connect to, for example, the inner duct 120 and the outer duct 130, so as to fix a relative position of the inner duct 120 with respect to the outer duct 130.

Figure 6:
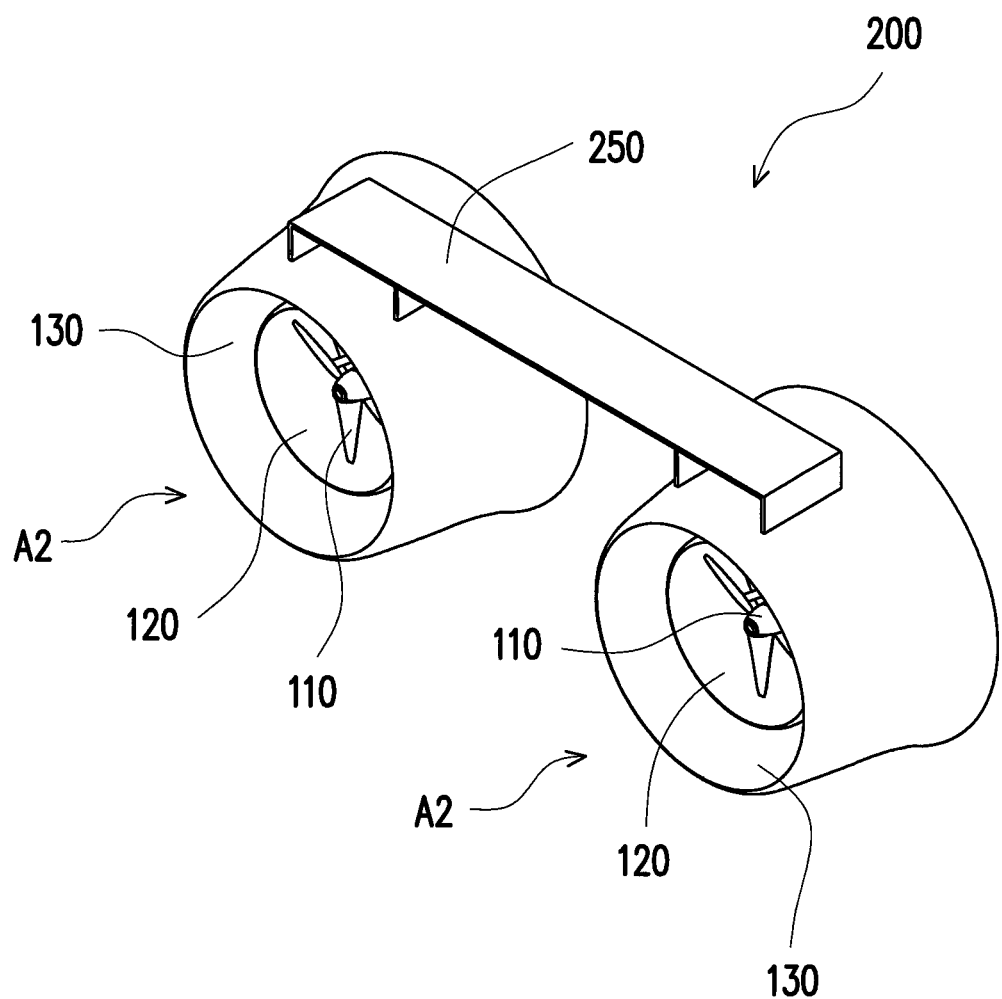
FIG. 6 is a schematic diagram of an ocean current power generating apparatus using dual-duct with boundary layer control effect according to another embodiment of the invention.

FIG. 6 is a schematic diagram of an ocean current power generating apparatus using dual-duct with boundary layer control effect according to another embodiment of the invention. Referring to FIG. 6. It should be noted that, a major difference between an ocean current power generating apparatus 200 of FIG. 6 and the ocean current power generating apparatus 100 of FIG. 3 is that the quantity of the power generating unit A2 is two. For example, the turbine 110 of one of the power generating unit A2 can be rotated clockwise while the turbine 110 of another one of the power generating unit A2 is rotated counterclockwise, so that the torque of the ocean current power generating apparatus 200 can be balanced easily under the sea. In addition, shapes of the turbine 110, the inner duct 120 and the outer duct 130 as depicted in FIG. 6 are similar to the shapes of the turbine 110, the inner duct 120 and the outer duct 130 as depicted in FIG. 3, and the fixing methods of the turbine 110, the inner duct 120 and the outer duct 130 are not particularly limited herein. Naturally, fixing methods of the turbine 110, the inner duct 120 and the outer duct 130 as depicted in FIG. 6 may refer to the fixing methods the turbine 110, the inner duct 120 and the outer duct 130 as depicted in FIG. 3.

In the present embodiment, the ocean current power generating apparatus 200 further includes a connecting part 250. The connecting part 250 is connected to the outer ducts 130 of the power generating units A2. That is, the power generating units A2 are assembled to each other by utilizing the connecting part 250, so as to constitute the ocean current power generation apparatus 200. A shape of the connecting part 250 is similar to a common airfoil, and the airfoil provided by the connecting part 250 may generate a great lifting force in the ocean current to fulfill the buoyant force required by the system. However, the invention is not limited thereto. In other embodiments, the quantity of the power generating unit may be increased depending on practical applications and design requirements, and the power generating units may be assembled to one another through the connecting part or other methods.

Figure 7:
FIG. 7 is a flow field vector diagram of one of power generating units in the ocean current power generating apparatus using dual-duct with boundary layer control effect of FIG. 6.

FIG. 7 is a flow field vector diagram of one of power generating units in the ocean current power generating apparatus using dual-duct with boundary layer control effect of FIG. 6. It should be noted that, FIG. 7 is illustrated by using one of the power generating units A2 for example. Therein, an arrow direction in FIG. 7 indicates a direction of the flow field while an arrow length indicates a magnitude of the flowing speed. First, referring to FIG. 2B. An outlet of the tail part of the traditional duct 54 is relatively greater and capable of driving the fluid to pass through the turbine 52 and to flow to the outside. Although this may effectively increase the velocity of the fluid passing though the turbine 52, the tail part of the duct 54 may cause the flow separation at the inner surface of the duct 54 due to diffusion being overly great, such that it will reduce the diffusion effect and the capability of the duct 54 in directing current.

Still referring to FIG. 7. In case the outer duct 130 is disposed, because there is the gap existed between the inner duct 120 and the outer duct 130, the velocity of the fluid passed through said gap is accelerated to generate the boundary layer control effect, so as to prevent the boundary layer at the inner surface of the tail part of the inner duct 120 from flow separation due to insufficient momentum of the fluid. In other words, the outer duct 130 can enhance the diffusion effect of the inner duct 120, thus more of the fluid may be directed into the turbine 110 to increase the velocity of the fluid passing through the turbine 110, such that the power generation efficiency of the power generating unit A2 may be effectively increased.

Figure 8:
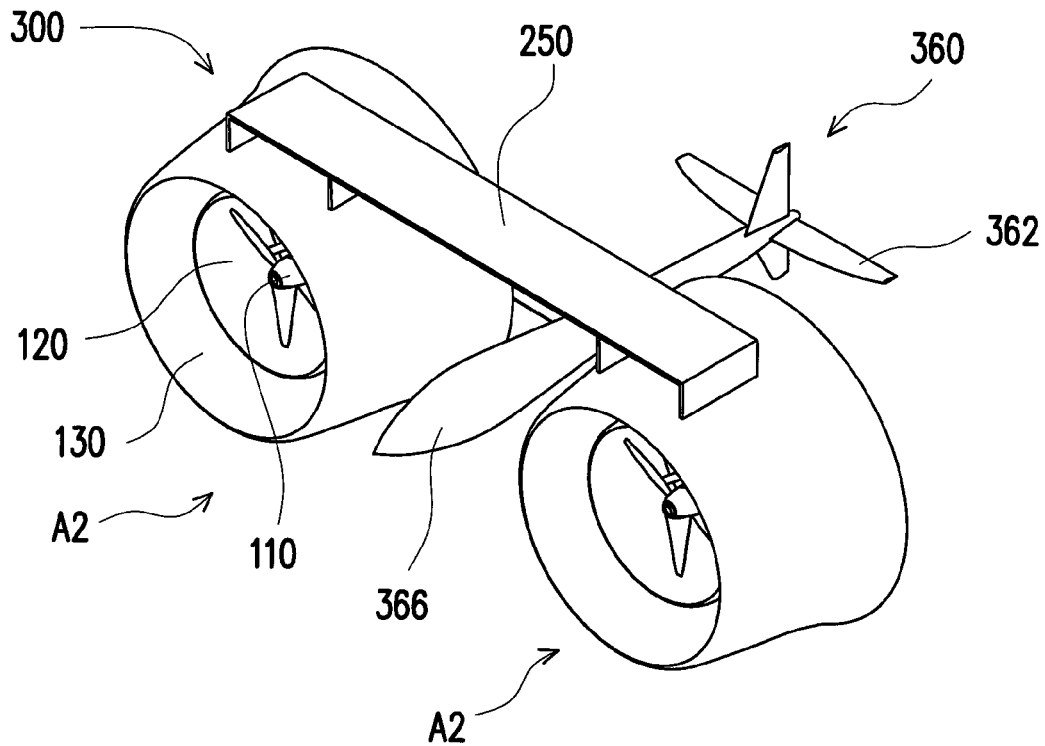
FIG. 8 is a schematic diagram of an ocean current power generating apparatus using dual-duct with boundary layer control effect according to another embodiment of the invention.
Figure 9:
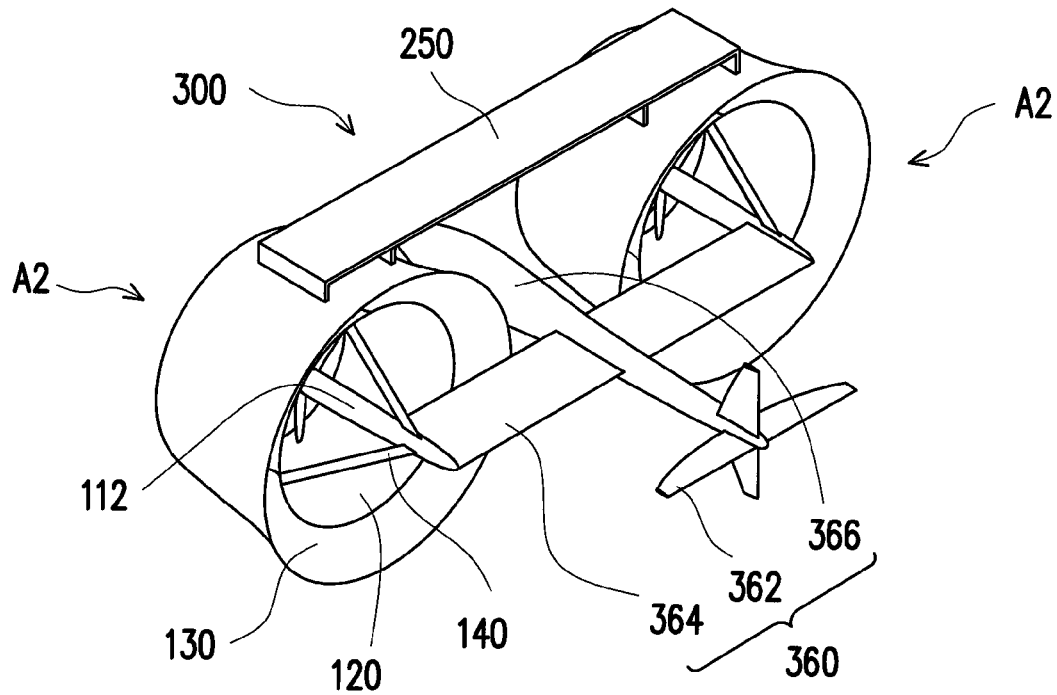
FIG. 9 is a schematic diagram of an ocean current power generating apparatus using dual-duct with boundary layer control effect from a different perspective.

FIG. 8 is a schematic diagram of the ocean current power generating apparatus using dual-duct with boundary layer control effect according to another embodiment of the invention. FIG. 9 is a schematic diagram of the ocean current power generating apparatus using dual-duct with boundary layer control effect from a different perspective. Referring to FIG. 8 and FIG. 9. It should be noted that, a difference between an ocean current power generating apparatus 300 of FIG. 8 and the ocean current power generating apparatus 200 of FIG. 7 is that the ocean current power generating apparatus 300 further includes a platform 360. The platform 360 connects to the power generating units A2.

In the present embodiment, the platform 360 includes a tail wing part 362, a lateral wing part 364 and a center body 366. A front end of the center body 366 may be located between the outer ducts 130 of the power generating units A2 or may be extruded depending on the buoyant force required, and the back end of the center body 366 is connected to the tail wing part 362. The lateral wing part 364 is located at the middle section of the center body 366 and connected to the power generating units A2. With said configuration, the lateral wing part 364 may assemble the power generating units A2 to one another, and the power generating units A2 may be maintained to always face the flowing direction of the fluid by the tail wing part 362.

In addition, the center body 366 is, for example, a hollow structure or filled with foam material therein, so that an overall density of the center body 366 is smaller than that of seawater to provide a buoyant force required by the ocean current power generating apparatus 300 to float in the sea. Naturally, the outer duct 130 may also selectively adopt the hollow structure for providing the buoyant force. Moreover, a distribution of the buoyant force of the ocean current generating apparatus in longitudinal direction may also provided by designing different shapes of the hollow center body, so as to achieve a reasonable gesture at both the front end and the back end for the ocean current power generating apparatus in longitudinal direction.

Figure 10:
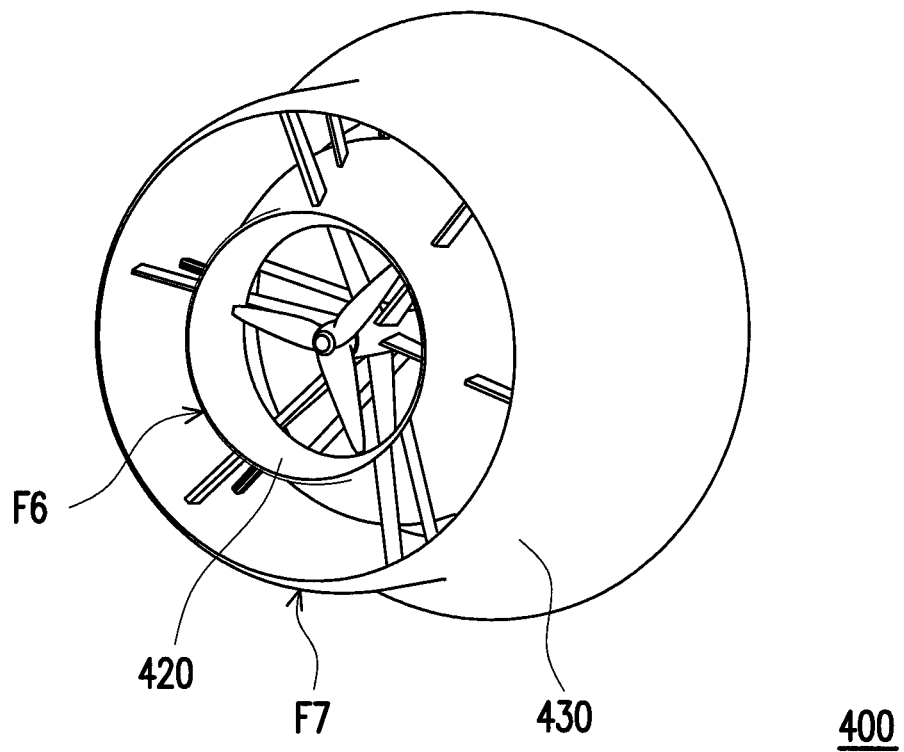
FIG. 10 is a schematic diagram of an ocean current power generating apparatus using dual-duct with boundary layer control effect according to yet another embodiment of the invention.
Figure 11A:
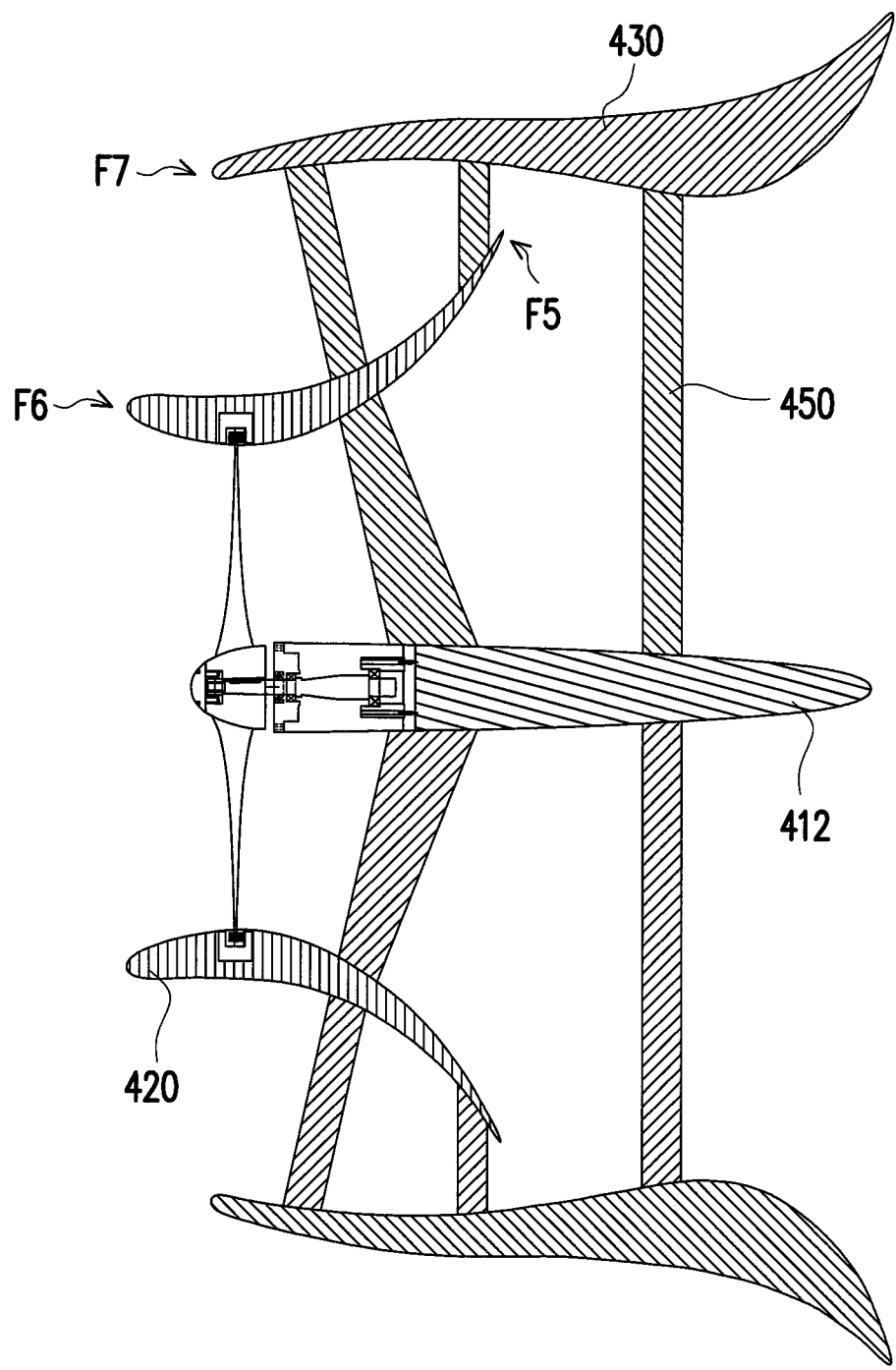
FIG. 11A is a cross-sectional diagram of the inner duct and the outer duct in FIG. 10.
Figure 11B:
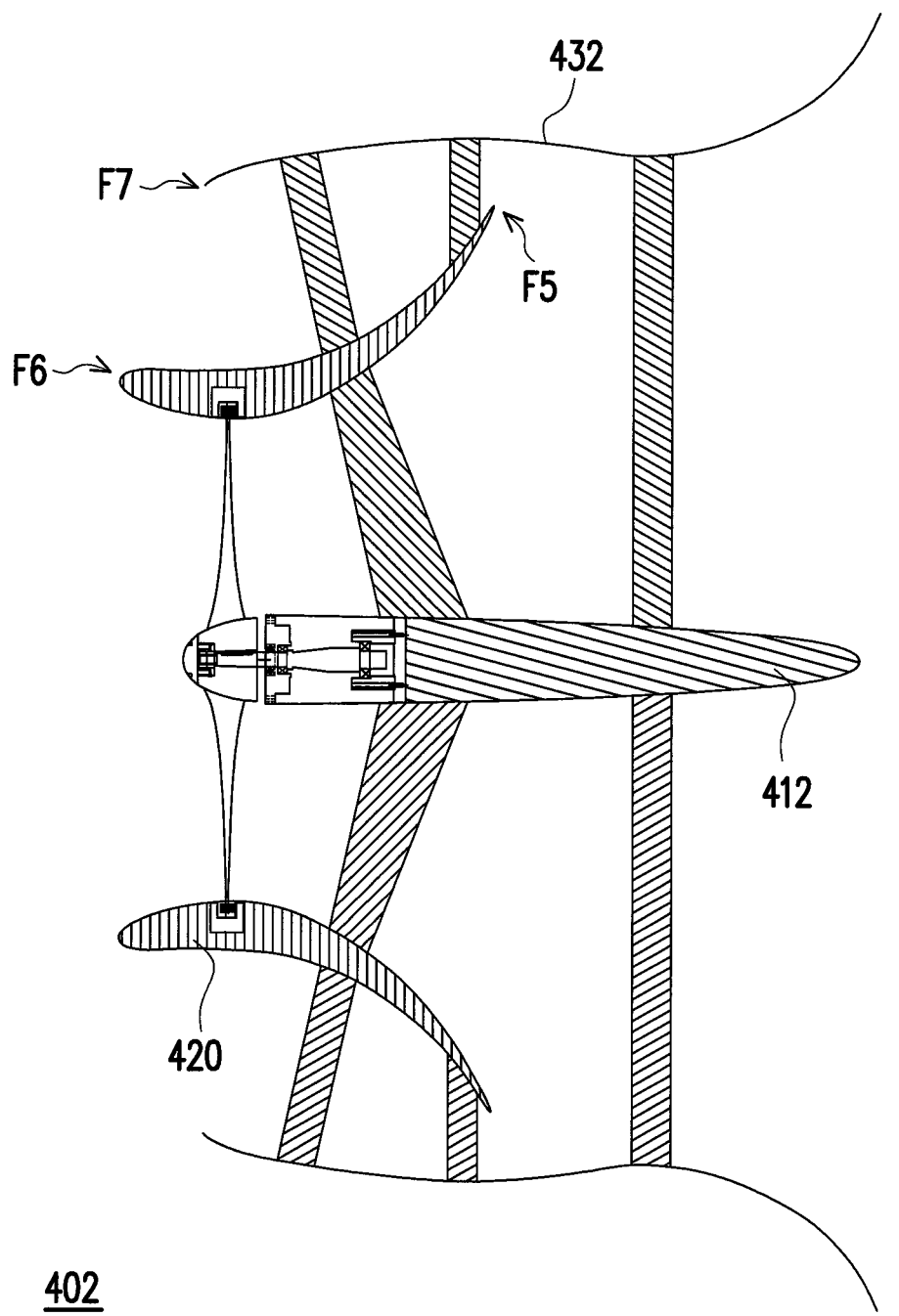
FIG. 11B is a cross-sectional diagram of an ocean current power generating apparatus using dual-duct with boundary layer control effect according to still another embodiment of the invention.

FIG. 10 is a schematic diagram of an ocean current power generating apparatus using dual-duct with boundary layer control effect according to yet another embodiment of the invention. FIG. 11A is a cross-sectional diagram of the inner duct and the outer duct in FIG. 10. Referring to FIG. 10 and FIG. 11A, an ocean current power generating apparatus 400 of the present embodiment is similar to that depicted in FIG. 3. Major differences between the two are: a total length of the inner duct 420 on the flow field direction is a lot less than a total length of the outer duct 430 on the flow field direction; an outflow side F5 of the inner duct 420 is only located at a place approximate to a middle section of the outer duct 430; and an inflow side F6 of the inner duct 420 is extruded to outside an inflow side F7 of the outer duct 430. In an embodiment which is not illustrated, the inflow side of the inner duct may also be aligned with the inflow side of the outer duct. FIG. 11B is a cross-sectional diagram of the ocean current power generating apparatus using dual-duct with boundary layer control effect according to still another embodiment of the invention. Referring to FIG. 11B, an ocean current power generating apparatus 402 of the present embodiment is similar to that depicted in FIG. 11A, only, the outer duct 430 depicted in FIG. 11A is replaced by an outer duct 432 with a single-plate structure instead. The boundary layer control effect is mostly provided from the inner walls of the outer duct 432, thus the outer duct 430 being replaced by the outer duct 432 of FIG. 11B does not affect the boundary layer control effect. In addition, reinforcing ribs may be disposed on inner surface or outer surface of the outer duct 432 with the single-plate structure. The reinforcing ribs are, for example, steel bars having cross-section in I-shape which are extended along the flow field direction.

Figure 12:
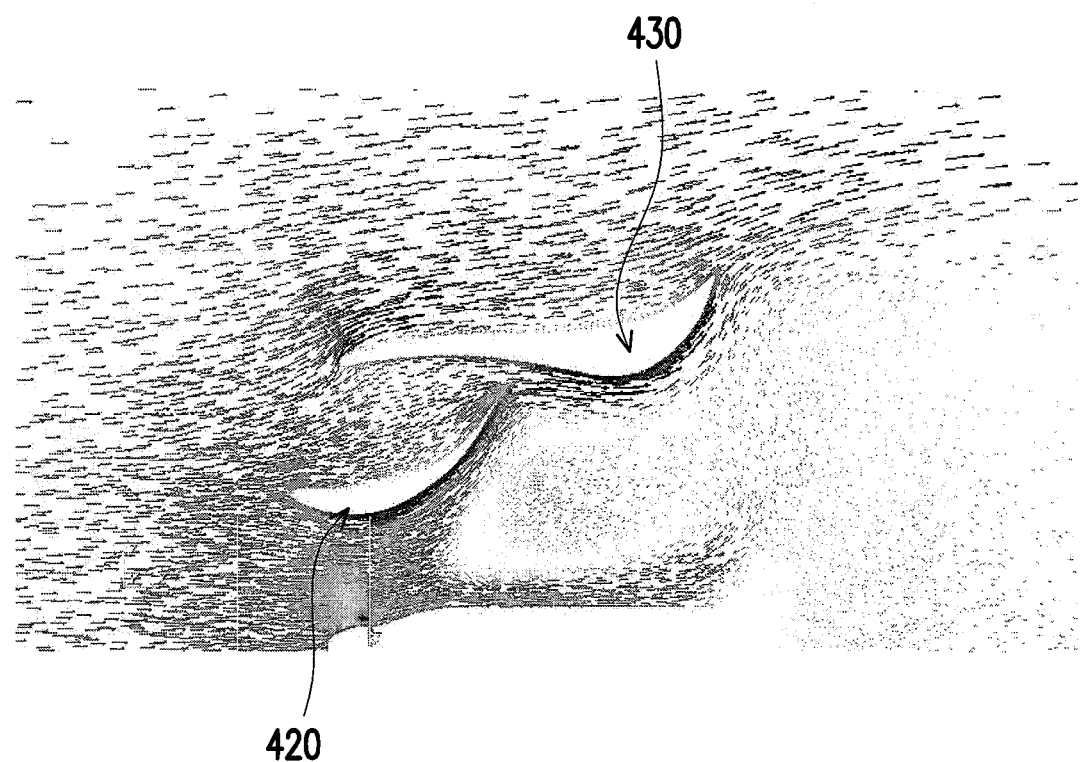
FIG. 12 is a flow field vector diagram of the ocean generating apparatus of FIG. 11A.

FIG. 12 is a flow field vector diagram of the ocean generating apparatus 400 of FIG. 11A. In view of FIG. 12, a power generation efficiency of the ocean current power generating apparatus 400 of the present embodiment is also quite high. In addition, the ocean current power generating apparatus 400 of the present embodiment also includes supporting struts 450 connecting to a shaft box 412 and the outer duct 430 to fix a relative location of the shaft box 412 with respect to the outer duct 430.

Figure 13:
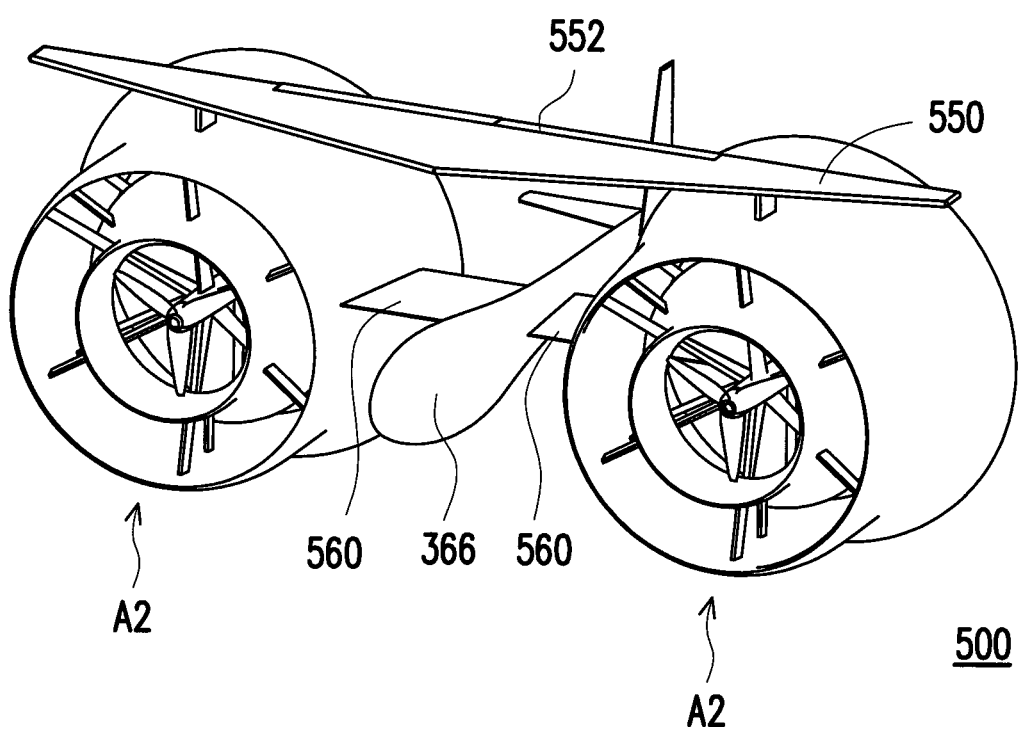
FIG. 13 is a schematic diagram of an ocean current power generating apparatus using dual-duct with boundary layer control effect according to yet another embodiment of the invention.

FIG. 13 is a schematic diagram of the ocean current power generating apparatus using dual-duct with boundary layer control effect according to another embodiment of the invention. An ocean current power generating apparatus 500 of FIG. 13 is similar to the ocean current power generating apparatus 300 of FIG. 8. Differences between the two are: the ocean current power generating apparatus 500 of FIG. 13 applies the ocean current power generating apparatus of FIG. 11A, and adopts a connecting part 550 with a shape even closer to the airfoil. A tail end of the connecting part 550 is designed to include a flap wing 522 in which the lifting force may be increased or reduced by adjusting an angle of the flap wing 522, so as to achieve an effect in which the ocean current power generating apparatus 500 may be controlled to float in different water depths. Moreover, there are airfoils 560 connected between the center body 366 and the power generating units A2.

Figure 14:
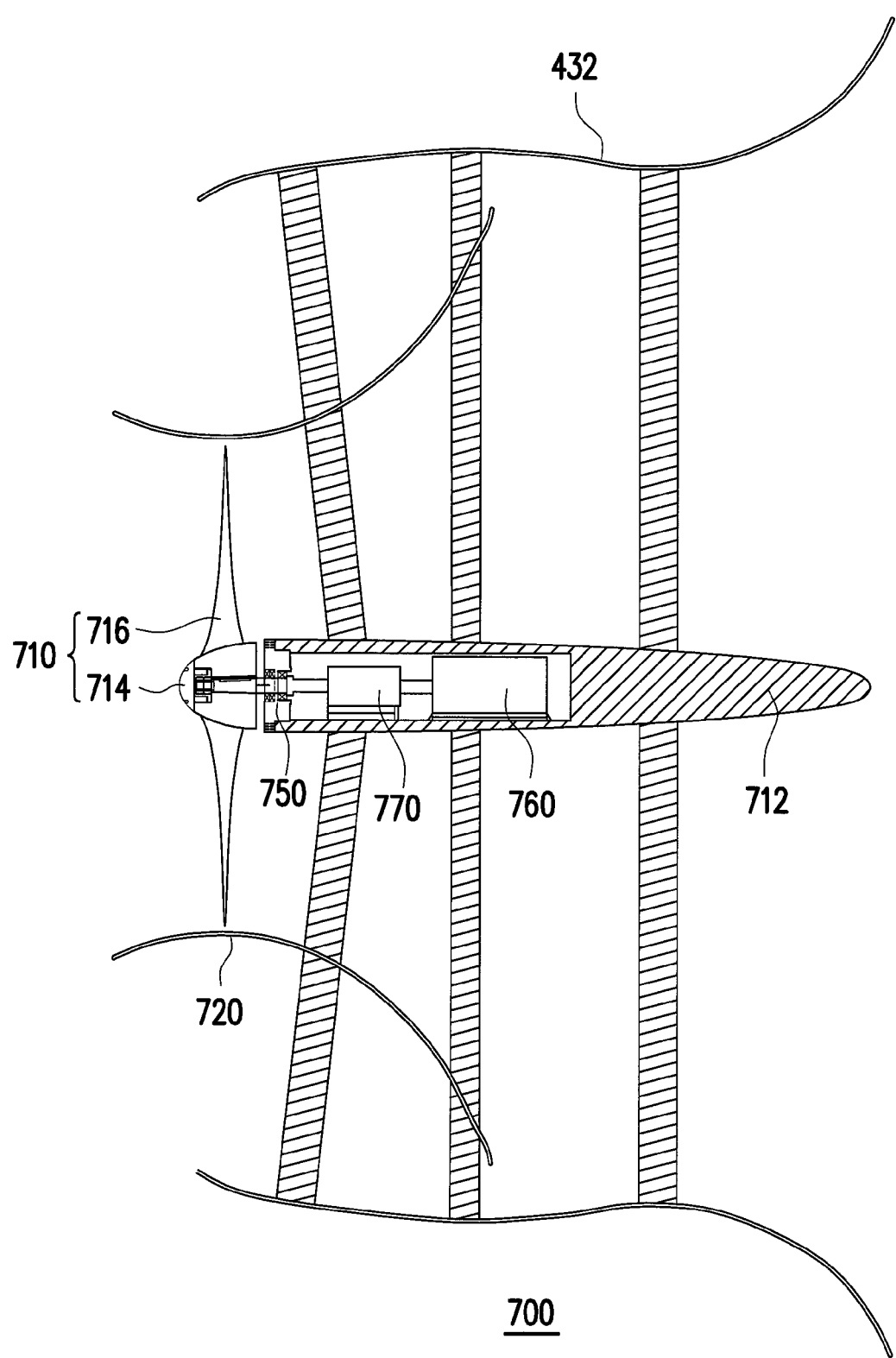
FIG. 14 is a cross-sectional diagram of an ocean current power generating apparatus using dual-duct with boundary layer control effect according to still another embodiment of the invention.

FIG. 14 is a cross-sectional diagram of the ocean current power generating apparatus using dual-duct with boundary layer control effect according to still another embodiment of the invention. Referring to FIG. 14, an ocean current power generating apparatus 700 of the present embodiment is similar to that depicted in FIG. 11B, but the inner duct 420 depicted in FIG. 11B is replaced by an inner duct 720 with a single-plate structure instead. The inner duct 720 with a single-plate structure is cheaper than the inner duct 420 depicted in FIG. 11B. In addition, the turbine 110 depicted in FIG. 4 is replaced by the turbine 710. The turbine 710 includes a shaft box 712, a hub part 714 and a plurality of blades 716, and an outer ring connected to the blades is canceled. The turbine 710 is connected to a power generator 760 through a mechanical seal 750 and a gearbox 770. Both the power generator 760 and the gearbox 770 are disposed inside the shaft box 712. The assembling of the turbine 710, the power generator 760 and the gearbox 770 is simple, cheap and reliable.

In summary, the ocean current power generating apparatus using dual-duct with boundary layer control effect provided in the invention includes the inner duct and the outer duct, and the outer duct is served as the boundary of the inner duct. When the ocean current power generating apparatus is placed in the ocean current, because the gap between the inner duct and the boundary constituted by the outer duct is limited, it is hard for the fluid to pass through the gap between the inner duct and the boundary constituted by the outer duct, such that most of the fluid are forced to be directed into the inner duct and passed through the turbine thereby increasing the inflow velocity of the turbine. As a result, the power generation efficiency of the ocean current power generating apparatus may be effectively enhanced.

In addition, the inner duct and the outer duct of the invention are designed in shape of the diffused type duct to enhance the diffusion effect of the inner duct, so as to increase the flowing velocity of the fluid passing through the inner duct. Moreover, the gap between the inner duct and the outer duct may also be used for the boundary layer control, so as to prevent the separation caused by diffusion being overly great from happening at the inner surface of the inner duct. Besides, the ocean current power generating apparatus using dual-duct with boundary layer control effect of the invention is capable of floating in the sea through the different parts of the ocean current power generating apparatus with hollow structure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An ocean current power generating apparatus using dual-duct with boundary layer control effect, comprising:
at least one power generating unit, comprising:
a turbine having a shaft box;
an inner duct, being a hollow structure or filled with foam material therein, wherein the turbine is located inside the inner duct, and an outer diameter of an inflow side of the inner duct is less than an outer diameter of an outflow side of the inner duct; and
an outer duct, being a single-piece structure without a hollow therein, wherein the outflow side of the inner duct is located inside the outer duct, an outer diameter of an inflow side of the outer duct is less than an outer diameter of an outflow side of the outer duct, and the boundary layer control effect for the inner duct is generated due to a gap existed between the outflow side of the inner duct and the outer duct.

2. The ocean current power generating apparatus using dual-duct with boundary layer control effect of claim 1, wherein the outer duct is a single-plate structure.

3. The ocean current power generating apparatus using dual-duct with boundary layer control effect of claim 1, wherein the inflow side of the inner duct is located inside the outer duct, outside the outer duct or aligned with the inflow side of the outer duct.

4. The ocean current power generating apparatus using dual-duct with boundary layer control effect of claim 1, wherein a distance between the outflow side of the inner duct and the outer duct is less than a distance between the inflow side of the inner duct and the outer duct.

5. The ocean current power generating apparatus using dual-duct with boundary layer control effect of claim 1, further comprising a plurality of support struts connecting to the shaft box and the inner duct, connecting to the inner duct and the outer duct, and connecting to the shaft box and the outer duct.

6. The ocean current power generating apparatus using dual-duct with boundary layer control effect of claim 1, further comprising a connecting part, wherein a quantity of the at least one power generating unit is two, and the connecting part is connected to the outer ducts of the power generating units.

7. The ocean current power generating apparatus using dual-duct with boundary layer control effect of claim 6, further comprising a platform connecting to the power generating units.

8. The ocean current power generating apparatus using dual-duct with boundary layer control effect of claim 7, wherein the platform comprises a tail wing part, a lateral wing part and a center body, a back end of the center body is connected to the tail wing part, and the lateral wing part is located at a middle section of the center body and connected to the power generating units.

9. The ocean current power generating apparatus using dual-duct with boundary layer control effect of claim 8, wherein the center body is a hollow structure or filled with foam material therein.

10. The ocean current power generating apparatus using dual-duct with boundary layer control effect of claim 1, further comprises a hub part and a plurality of blades, the hub part is connected to the shaft box, and the blades are connected to the hub part.

11. The ocean current power generating apparatus using dual-duct with boundary layer control effect of claim 10, further comprising a power generator, a mechanical seal and a gearbox disposed inside the shaft box, wherein the turbine is connected to the power generator through the mechanical seal and the gearbox.

\* \* \* \* \*